Feb. 12, 1935. M. L. WILLITS 1,991,305
LAWN TRIMMING DEVICE
Filed Nov. 20, 1933
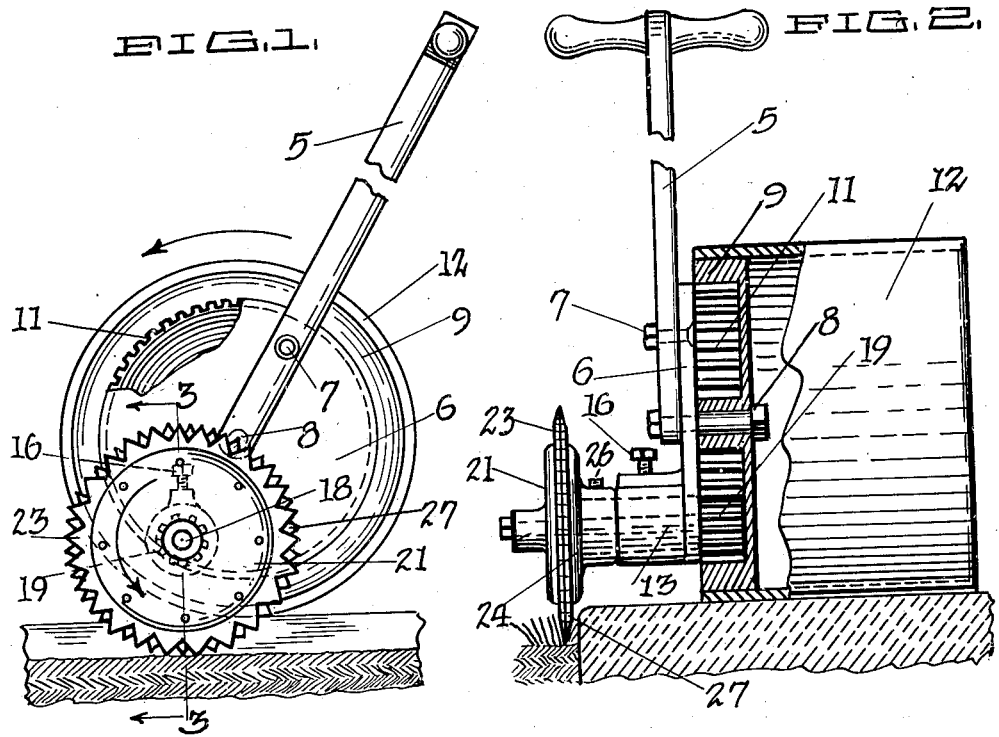
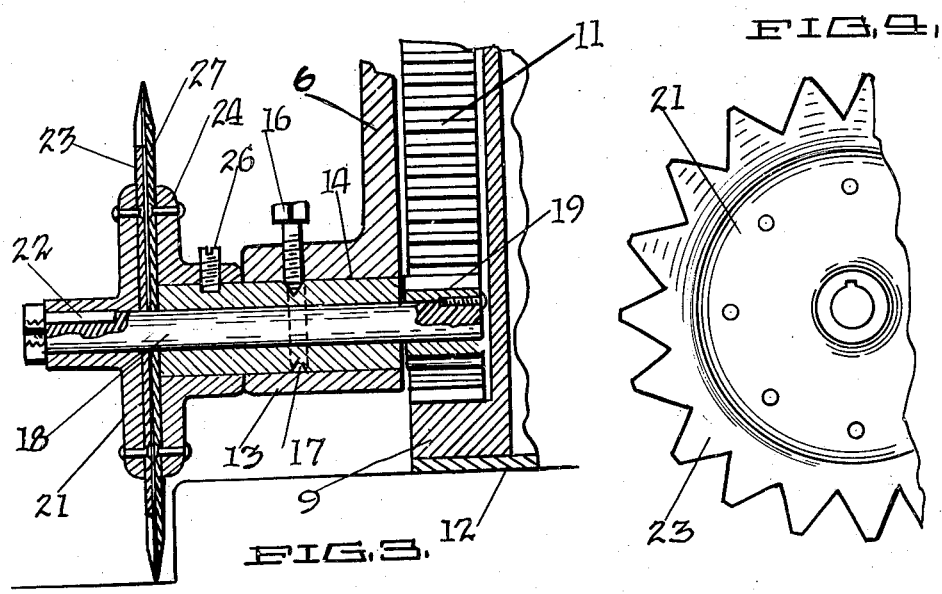
INVENTOR
MILFORD L. WILLITS
BY
ATTORNEYS.

Patented Feb. 12, 1935

1,991,305

UNITED STATES PATENT OFFICE 1,991,305

LAWN TRIMMING DEVICE

Milford L. Willits, Santa Ana, Calif.

Application November 20, 1933, Serial No. 698,917

1 Claim. (Cl. 56—256)

This invention relates to improvements in lawn trimming devices, and has particular reference to an edging device capable of being used adjacent sidewalks and similar places, where it is desired to trim the edge of the lawn.

The principal object of the invention is to provide a shearing arrangement which will effectively trim grass, sod and the like so as to present a neat appearance without the employment of the ordinary hand-shears.

Another object is to produce a device which may be employed by an unskilled person.

A further object is to produce a device which will quickly cut the edge thus eliminating the tedious and time consuming operation.

A still further object is to produce a device which is economical to manufacture.

In the accompanying drawing forming a part of this specification and in which like numerals are employed to designate like parts throughout the same, Fig. 1 is a side elevation of my device having a portion thereof broken away, Fig. 2 is a front elevation of Fig. 1, and having a portion thereof broken away, Fig. 3 is an enlarged fragmentary cross-sectional view taken on the line 3—3 of Fig. 1, and Fig. 4 is a fragmentary detail view of one of the cutting blades.

In trimming lawns the ordinary lawn mower will not trim the grass adjacent curbs, sidewalks, coping and the like. It, therefore, becomes necessary to employ shears so that the grass may be cut at these points. Applicant has therefore devised an arrangement somewhat similar to a lawn mower which has a handle 5 which is attached to a plate 6 by bolts 7 and 8. Rotatably supported on the plate 6 by the bolts 8 is a wheel 9 having an internal gear 11. If desired an auxiliary wide thread 12 may be attached to the wheel 9, the purpose of which is obvious.

This plate 6 carries a projection 13 having a bore therethrough whereby a bearing 14 may be inserted in the bore and held so positioned by a set screw 16 entering a groove 17 formed in the outer surface of the bearing.

A shaft 18 is rotatably mounted in the bearing and has a gear 19 which meshes with the internal gear 11. This shaft carries a plate 21 which is keyed thereto as shown at 22. A cutting disc 23 is riveted to the plate 21 so as to be rotated therewith.

A plate 24 is mounted upon the bearing 14 and held in fixed position thereon by a set screw 26. A stationary cutter disc 27 is riveted to the plate 24. This arrangement causes the cutter discs 23 and 27 to be in close parallel alignment. These discs are each provided near their periphery with cutting teeth with the result that when the disc 23 is revolved with respect to the disc 27, any material extending between the teeth will be effectively cut.

It will thus be seen that when the device is rolled over a surface as illustrated in Figures 1 and 2, the gears adjacent the groove will be engaged and the cutting action of the teeth will trim the grass in a most efficient manner.

It is to be noted that the screw 26 can be readily adjusted on the shaft 18, if desired, to thus loosen the plate 24, and present new cutting sections of the stationary cutter disc 27.

Having thus described my invention, I claim:—

In a device of the character described, a ground engaging wheel, an internal gear formed in said wheel, a plate rotatably supported on said wheel, a shaft rotatably supported in said plate, said shaft having a gear engaging said internal gear, a disc mounted on said shaft and capable of rotation therewith, said disc having cutting teeth, a second disc supported in parallel cutting alignment and concentric with said first disc, said discs being in close proximity to each other, said second disc being held against rotation with respect to said first disc, said second disc having cutting teeth and means for moving said device over a surface to be cut.

MILFORD L. WILLITS.